R. FREER & S. GREER.
STEAM TRAP.
APPLICATION FILED JAN. 2, 1906.

993,591.

Patented May 30, 1911.
2 SHEETS—SHEET 2.

UNITED STATES PATENT OFFICE.

ROBERT FREER AND SAMUEL GREER, OF PROVIDENCE, RHODE ISLAND, ASSIGNORS OF ONE-THIRD TO WILLARD T. HATCH, OF PROVIDENCE, RHODE ISLAND.

STEAM-TRAP.

993,591.        Specification of Letters Patent.        Patented May 30, 1911.

Application filed January 2, 1906. Serial No. 294,057.

*To all whom it may concern:*

Be it known that we, ROBERT FREER and SAMUEL GREER, both of Providence, county of Providence, and State of Rhode Island, have invented certain new and useful Improvements in Steam-Traps; and we do hereby declare the following specification, taken in connection with the accompanying drawings, forming a part of the same, to be a full, clear, and exact description thereof.

In steam-traps as heretofore constructed the discharge of water from the trap has been either through a single outlet of large area or through a series of small outlets centrally arranged about such large outlet. With such construction, as the water flows from the trap, a whirlpool or suction action is developed which tends to carry over the steam with the water, and in many cases the effect has been that the steam in flowing through would serve to hold back the water and prevent its discharge from the trap.

The present invention has for its object to overcome the objections referred to, and to this end one feature of the invention consists broadly speaking in decentralizing the discharge of water from the trap, and more specifically in providing means whereby the flow of water from the chamber of the trap will be through a restricted orifice or orifices located at one side of the discharge outlet of said trap.

The invention further consists in certain features of construction to be hereinafter described and claimed.

Figure 1:
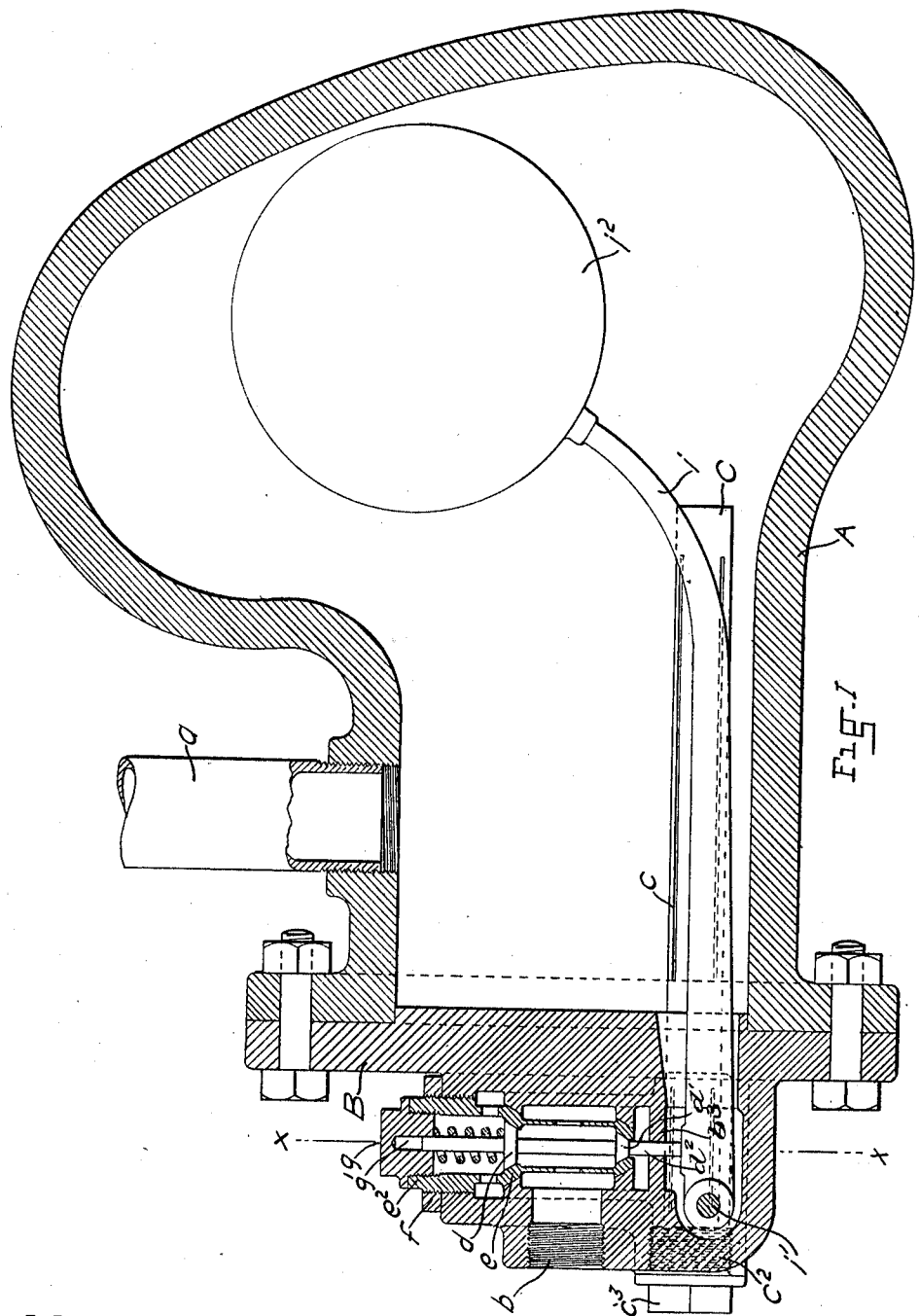
Figure 2:
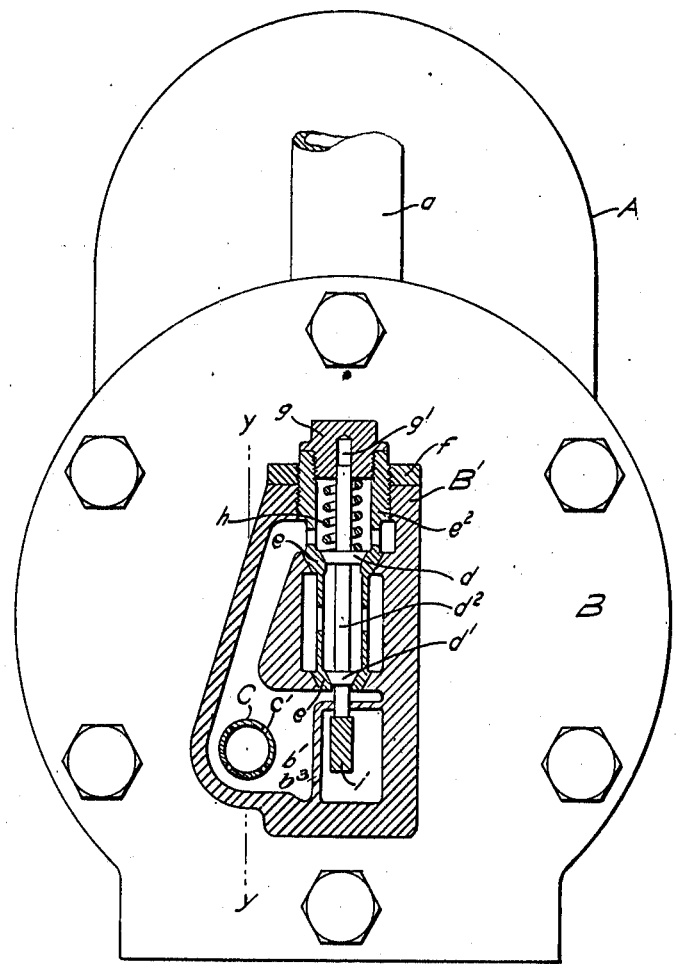
Figure 3:
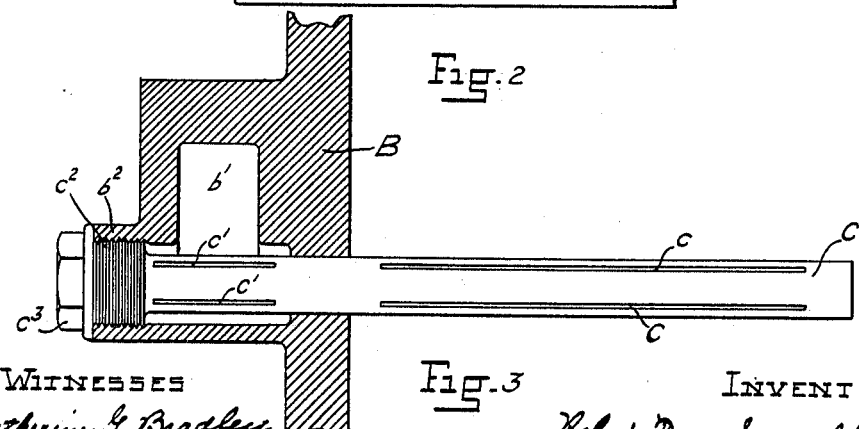

Referring to the drawings, Figure 1 is a section through a steam-trap embodying our invention. Fig. 2 is an end view partly in section, the section being taken on the line $x$—$x$, Fig. 1. Fig. 3 is a partial section on an enlarged scale on the line $y$—$y$ of Fig. 2.

A represents the body of the trap which is closed by the head B secured to the body by suitable bolts as shown.

$a$ is the inlet pipe communicating with the interior of the trap body, and $b$ is the discharge outlet therefrom.

Secured to the head B and projecting therethrough is a pipe or tube C which is closed at its inner end and provided within the trap body with one or more elongated slots $c$ $c$ and also provided with one or more discharge slots $c'$ communicating with the chamber $b'$ in the head B. Preferably the pipe or tube C is detachably connected with the head B. In the construction shown the pipe C is provided at its outer end with a screw-thread $c^2$ adapted to engage a corresponding thread formed in the boss $b^2$, said pipe being also provided with a head $c^3$ for the application of a wrench.

The communication between the chamber $b'$ and the outlet $b$ is controlled by a differential valve $d$ $d'$, these valves being secured to a common valve stem $d^2$. The valve seats $e$ $e'$ of the valves $d$ $d'$ are formed integral with each other, both of said valve seats forming a part of a single valve casing $e^2$, which valve casing is detachably secured in position in the head B. As shown in Fig. 2, the valve casing $e^2$ projects through the projecting portion B′ of the head B, and the outer end of the valve casing is screw-threaded exteriorly to engage a corresponding screw-thread formed in the projection or casing B′. A lock-nut $f$ serves to hold the valve casing in adjusted position.

Screwed into the outer open end of the valve casing $e^2$ is a screw-plug $g$ which is provided with a central orifice $g'$ to receive the projecting end of the valve stem $d^2$. Surrounding this projecting portion of the valve stem is a spiral spring $h$, one end of which spring bears against the screw-plug $g$ and the other end bears against the valve $d$.

For operating the differential valve $d$ $d'$ the usual lever $i$ is pivoted at $i'$ in the casing B′, said lever being arranged to underlie the projecting lower end of the valve-stem $d^2$, said lever being provided at its free end with the float $i^2$. The pivoted end of the lever $i$ is located in a chamber $b^3$ formed by a partition $b^4$, which partition separates said chamber $b^3$ from the chamber $b'$. The chamber $b^3$ is closed on all sides except for the opening in the head B through which the end of the lever $i$ extends, and so that the water entering said chamber can pass no farther and cannot reach either of the valves $d$ $d'$.

The operation of the apparatus as above described is as follows: When the water in the body of the trap has risen to the predetermined level, the lever $i$ under the action of the float $i^2$ will serve to lift the valve-stem $d^2$ and with it the differential valves $d$ $d'$ against the action of the spring $h$ and so that the water may flow out of the trap through the outlet $b$. By reason of the fact that the chamber $b^3$ is closed by the partition $b^4$, the water which enters said chamber through the opening for the lever $i$ cannot reach the outlet $b$, but is retained in said chamber. In flowing out of the trap therefore the water must first pass through the elongated slot or slots $c$ into the pipe C and thence through the elongated slot or slots $c'$ into the chamber $b^7$ and thence through the valves $d$ $d'$ and the valve casing to the discharge outlet $b$. By reason of the fact that the slots $c$ are of restricted area and are located at one side of the discharge outlet, the flow of water from the trap is decentralized and the whirlpool or sucking action prevented, whereby the water is sufficiently separated from the steam and only the water is permitted to flow out of the trap. When the level of the water in the trap has fallen to the proper point the differential valves $d$ $d'$ will be closed by the spring $h$ or by the flow of the water acting on the differential area of the valve $d$, so as to prevent further discharge from the trap. The parts are so constructed and arranged that said differential valves will be closed before the water has fallen to the level of the pipe C and so that said pipe will always remain immersed in the water in the trap.

By reason of the fact that the pipe C is detachably secured to the head of the trap, said pipe may be readily removed at any time for cleaning or otherwise. As will also be seen, the valves $d$ $d'$ and the valve casing $d^2$ with the valve seats may likewise be readily removed whenever desired. If it be desired simply to remove the valves, all that is necessary to be done is simply to unscrew the plug $g$ when the valves with their connected valve stems may be readily removed from the valve casing and may likewise be conveniently replaced. If it be desired to also remove the valve casing, this may be done by loosening the lock-nut $f$ and unscrewing the valve casing from the casing B. As will be obvious, the valves and valve casing may all be removed together and the valves subsequently removed from the casing by unscrewing the plug $g$.

While we have shown the pipe C as provided with elongated slots $c$, if desired said pipe may be provided with a series of perforations distributed lengthwise thereof in place of said slots.

While it is preferred to employ the differential valve construction shown and described, for the reason that thereby the pressure tending to hold the valve closed, and which is to be overcome by the float in rising, is operative only upon the differential area of the valve $d$, it is evident that so far as the main features of the invention are concerned a single valve for controlling the discharge may, if desired, be employed in place of said differential valve.

What we claim as our invention and desire to secure by Letters Patent is:

1. A steam-trap comprising a chamber and a discharge outlet and provided with a restricted orifice or orifices located near the bottom of said chamber and at one side of said discharge outlet, substantially as described.

2. In a steam-trap, the combination, with the body of the trap, of a pipe extending into the chamber thereof, said pipe being substantially parallel with the bottom of said chamber, said pipe being provided with a restricted orifice or orifices, substantially as described.

3. In a steam-trap, the combination, with the body of the trap, of a pipe extending into the chamber thereof, said pipe being provided with a restricted inlet orifice or orifices and with a restricted discharge orifice or orifices, substantially as described.

4. In a steam-trap, the combination, with the body of the trap, of a pipe extending into the chamber thereof near the bottom of said chamber and provided with a restricted orifice or orifices, said pipe being detachably secured to said trap body, substantially as described.

5. In a steam-trap, the combination, with the discharge outlet and the controlling valve, of a valve casing projecting to the outside of the trap, said valve casing being independent of the discharge outlet and being detachably secured in position, substantially as described.

6. In a steam-trap, the combination, with the discharge outlet and the controlling valve, of a valve casing provided with a seat for the valve, said valve casing being independent of the discharge outlet and provided with a detachable head by the removal of which the valve may be removed from said casing, substantially as described.

7. In a steam-trap, the combination, with the discharge outlet and the controlling valve, of a valve casing provided with a seat for the valve, said valve casing being independent of the discharge outlet and being detachably secured in position and provided with a removable head, substantially as described.

8. In a steam-trap, the combination, with the discharge outlet and the controlling valve, of a valve casing independent of said discharge outlet and provided with a seat for the valve, said valve casing being provided with a removable head, and a spring arranged to bear against said valve and against said removable head, substantially as described.

ROBERT FREER.
SAMUEL GREER.

Witnesses:
W. H. THURSTON,
J. H. THURSTON.

Copies of this patent may be obtained for five cents each, by addressing the "Commissioner of Patents, Washington, D. C."